UNITED STATES PATENT OFFICE.

EDWARD F. WHITE, OF QUINCY, MASSACHUSETTS.

ASBESTOS SHOE-FILLER AND PROCESS OF MAKING THE SAME.

No. 864,277.

Specification of Letters Patent.

Patented Aug. 27, 1907.

Application filed March 4, 1907. Serial No. 360,471.

*To all whom it may concern:*

Be it known that I, EDWARD F. WHITE, a citizen of the United States, residing at Quincy, (Wollaston district,) in the county of Norfolk and State of Massachusetts, have invented an Improvement in Asbestos Shoe-Filler and Process of Making the Same, of which the following description, in connection with the accompanying drawings, is a specification, like letters on the drawings representing like parts.
This invention relates to a new composition of matter and the method of making the same.

While the composition may be used for various purposes and in different relations, I primarily intend it for use as a shoe filler that is to be applied to the shoe to fill the cavity of the inner sole level with the welt to place it in condition for receiving the outer sole.

An object of my invention is to provide a shoe filler that may be applied cold or at normal temperature to the shoe as a permanently plastic and flexible mass that not only is dry as applied but is substantially moisture repellent as well as non heat or cold conducting.

In the carrying out of my process the composition is prepared cold or at a normal temperature, thus avoiding the objectionable features incident to the use of heat in the preparation of a shoe filler. Inasmuch as the filler is dry or substantially dry when applied, although evenly, thoroughly and permanently plastic, the shoe having such filler applied thereto is ready for the next operation after a comparatively brief interval of time.

Preferably I employ as a main ingredient of my composition asbestos fiber, which I preferably grind to suit it for the purpose. This substance not being readily a conductor of heat or cold is well fitted for my purpose, inasmuch as the external temperature is not readily conveyed to the foot through the sole of the shoe. Within the scope of my invention any suitable material may be substituted for asbestos.
Preferably I render the asbestos substantially waterproof by applying thereto a moisture repelling fluid or liquid that may be intimately mingled with the asbestos by absorption of the liquid by the fibers of the asbestos. I have found that viscol is well suited to my purpose inasmuch as it contains a sediment that permanently remains in or closely associated with the asbestos, thus to a certain extent serving as a filler therefor as well as rendering the same waterproof. The viscol or substitute employed by me is of an oily nature. Within the scope of my invention any suitable waterproofing substance may be employed. In the carrying out of my process, the asbestos thus wetted with viscol should be thoroughly dried.

In order to render the composition thoroughly and permanently plastic or pliable, I apply thereto any suitable substance. Preferably I employ a cementitious substance which may be rubber cement, that is—rubber dissolved in naphtha. Such cement should be thoroughly mixed with the asbestos by stirring the mixture.

In order to render the composition smooth and possible of even application by a trowel or the like, I apply any suitable filler to the composition whereby the interstices may be completely filled. For the purpose, I preferably employ a non-liquid filler, and have found white dry lead well suited to my purpose. The white lead or substitute not only acts as a drier but gives a smooth surface to the composition, thus the composition may be spread easily and quickly with a trowel or the like.

In order thoroughly to dry the composition, I may employ any suitable and preferably a non-liquid drier, such as sugar of lead. If desired, I may add comminuted cork to the composition.

While I am in no wise to be restricted to any proportions of the ingredients of my herein described composition, I would state that I have obtained excellent results by using two quarts of asbestos, one pint of viscol, one pint of rubber cement, from one half pound to one pound of white lead, one half pound of sugar of lead and about two ounces of ground cork These proportions and quantities may, in practice, be varied, but the asbestos is the principal final constituent of the composition, and preferably it constitutes more than 50% of the final composition.

As heretofore stated, each step of my process is carried out with the ingredients of the composition at normal temperature, and the composition is applied cold or at normal temperature. Moreover owing to the ingredients employed the filler has but little moisture therein as applied to the shoe and becomes quickly dried, so that the sole of the shoe may be applied in a half hour more or less. My composition is substantially waterproof and is permanently plastic, pliable or flexible because of its described construction, and is characterized by the non-conducting properties of the asbestos.

The composition may be readily and evenly applied and retains its position in the shoe throughout the life thereof.

If desired, I may add to a batch of composition an ingredient to prevent too rapid drying of the filler before use. I have found pitch or the equivalent effective for the purpose and may add a small quantity of so-called "venice" which if desired may be reduced as by naphtha.

Having thus described my invention, I desire it to be understood that although I have used specific terms they are used in a descriptive and generic sense and not for purposes of limitation, the scope of the invention being set forth in the following claims.

Claims.

1. A permanently plastic and pliable shoe filler adapted to be applied at normal temperature, comprising as the principal final constituent an asbestos base, an oily substance, rubber cement rendering the composition permanently elastic, and a filler rendering the composition easy to spread and imparting thereto a smooth surface, the said ingredients being intimately mixed and the resultant product being capable of application by spreading with a tool or the like, in a plastic condition and at a normal temperature.

2. A permanently plastic and pliable shoe filler adapted to be applied at normal temperature, comprising as the principal final constituent an asbestos base, rubber cement rendering the composition permanently elastic, and a filler rendering the composition easy to spread and imparting thereto a smooth surface, the said ingredients being intimately mixed and the resultant product being capable of application by spreading with a tool or the like, in a plastic condition and at a normal temperature.

3. A permanently plastic and pliable shoe filler adapted to be applied at normal temperature, comprising as the principal final constituent an asbestos base, rubber cement rendering the composition permanently elastic, a filler rendering the composition easy to spread and imparting thereto a smooth surface, and ground cork, the said ingredients being intimately mixed at a normal temperature, the resulting product being capable of application in a plastic condition and at a normal temperature.

4. A permanently plastic and pliable shoe filler adapted to be applied at normal temperature, comprising as the principal final constituent, an asbestos base, rubber cement rendering the composition permanently elastic, a filler rendering the composition easy to spread and imparting thereto a smooth surface, ground cork and pitch or the like serving to keep the composition moist until ready for use, the several ingredients being intimately mixed and the resulting product being capable of application by spreading in a plastic condition and at a normal temperature.

5. The process of preparing a shoe filler composition which consists in intimately mixing at a normal temperature and as the principal final constituent an asbestos base, an oily substance, rubber cement and a filler, the rubber cement rendering the composition permanently elastic and the filler imparting thereto a smooth surface, the resulting composition being capable of application in a plastic condition and at a normal temperature.

6. The process of preparing and applying a shoe filler composition which consists in intimately mixing at a normal temperature and as the principal final constituent an asbestos base, rubber cement, and a filler imparting to the composition a smooth surface, and finally spreading the composition at a normal temperature and in a plastic condition to the inner sole of a shoe to place it in condition for receiving the outer sole.

7. The process of preparing a shoe filler composition which consists in intimately mixing at a normal temperature and as the principal final constituent an asbestos base, rubber cement rendering the composition permanently elastic, a filler imparting a smooth surface thereto, and ground cork, the resulting product being capable of application in a plastic condition and at a normal temperature.

8. The process of preparing a shoe filler composition which consists in intimately mixing at a normal temperature and as the principal final constituent an asbestos base, rubber cement rendering the composition permanently elastic, a filler rendering the composition easy to spread and imparting thereto a smooth surface, ground cork and pitch or the like to maintain the composition moist until ready for use, the resulting product being capable of application in a plastic condition and at a normal temperature.

9. A permanently plastic and pliable shoe filler adapted to be applied at normal temperature, comprising as the principal final constituent an asbestos base, an oily substance, rubber cement rendering the composition permanently elastic, a filler rendering the composition easy to spread and imparting thereto a smooth surface, ground cork and pitch or the like serving to keep the composition moist until ready for use, the several ingredients being intimately mixed and the resulting product being capable of application by spreading in a plastic condition and at a normal temperature.

10. A plastic shoe filler adapted to be applied at normal temperature and comprising asbestos, viscol intimately applied thereto, and rubber cement thoroughly mixed therewith, whereby the composition is rendered waterproof and thoroughly plastic.

In testimony whereof, I have signed my name to this specification, in the presence of two subscribing witnesses.

EDWARD F. WHITE.

Witnesses:
IRVING U. TOWNSEND,
THOMAS H. SEELY.